United States Patent
Iwata et al.

(10) Patent No.: US 10,253,120 B2
(45) Date of Patent: Apr. 9, 2019

(54) STEAM BARRIER RESIN, STEAM BARRIER COATING AGENT, STEAM BARRIER FILM, AND STEAM BARRIER LAMINATE

(71) Applicant: TOYO INK SC HOLDINGS CO., LTD., Tokyo (JP)

(72) Inventors: Tohru Iwata, Tokyo (JP); Kana Kida, Tokyo (JP); Takenobu Nakano, Tokyo (JP)

(73) Assignee: Toyo Ink SC Holdings Co., Ltd., Tokyo (JP)

( * ) Notice: Subject to any disclaimer, the term of this patent is extended or adjusted under 35 U.S.C. 154(b) by 0 days.

(21) Appl. No.: 14/373,157

(22) PCT Filed: Jan. 15, 2013

(86) PCT No.: PCT/JP2013/000130
§ 371 (c)(1),
(2) Date: Jul. 18, 2014

(87) PCT Pub. No.: WO2013/108614
PCT Pub. Date: Jul. 25, 2013

(65) Prior Publication Data
US 2014/0370314 A1    Dec. 18, 2014

(30) Foreign Application Priority Data
Jan. 20, 2012   (JP) ................... 2012-009922

(51) Int. Cl.
| | | |
|---|---|---|
| C08F 210/14 | (2006.01) | |
| B32B 27/32 | (2006.01) | |
| C09D 135/02 | (2006.01) | |
| B32B 9/00 | (2006.01) | |
| B32B 27/08 | (2006.01) | |
| B32B 27/36 | (2006.01) | |
| B32B 37/18 | (2006.01) | |

(Continued)

(52) U.S. Cl.
CPC ............ *C08F 210/14* (2013.01); *B32B 9/005* (2013.01); *B32B 27/08* (2013.01); *B32B 27/24* (2013.01); *B32B 27/286* (2013.01); *B32B 27/30* (2013.01); *B32B 27/32* (2013.01); *B32B 27/325* (2013.01); *B32B 27/34* (2013.01); *B32B 27/36* (2013.01); *B32B 37/182* (2013.01); *C08F 4/34* (2013.01); *C08F 8/42* (2013.01); *C08F 210/00* (2013.01); *C08F 222/06* (2013.01); *C08J 7/045* (2013.01); *C08J 7/047* (2013.01); *C09D 5/00* (2013.01); *C09D 135/02* (2013.01); *B32B 2250/02* (2013.01); *B32B 2250/24* (2013.01); *B32B 2255/10* (2013.01); *B32B 2307/518* (2013.01); *B32B 2307/7246* (2013.01); *B32B 2329/04* (2013.01); *B32B 2355/00* (2013.01); *B32B 2457/00* (2013.01); *C08F 2800/10* (2013.01); *C08F 2800/20* (2013.01); *C08F 2810/20* (2013.01); *C08F 2810/50* (2013.01);

(Continued)

(58) Field of Classification Search
CPC .... C08F 222/06; C08F 210/14; C08F 220/14; C08F 8/44; C08F 210/00; C08F 222/04; C08F 2810/20; C08F 4/60058; C08F 8/42; C08F 210/10; C08F 2800/20; C08F 2810/50; C08F 4/34; C08F 210/06; C08F 2800/10; B32B 2250/02; B32B 2250/24; B32B 2307/7246; B32B 2329/04; B32B 2355/00; B32B 27/08; B32B 27/32; B32B 27/36; B32B 2255/10; B32B 2307/518; B32B 2457/00; B32B 27/24; B32B 27/286; B32B 27/30; B32B 27/325; B32B 27/34; B32B 37/182; B32B 9/005; C08J 2367/02; C08J 2423/26; C08J 2435/00; C08J 7/045; C08J 7/047; C09D 135/02; C09D 5/00; Y10T 156/10; Y10T 428/31786
See application file for complete search history.

(56) References Cited

U.S. PATENT DOCUMENTS 3,267,083 A * 8/1966 Imhof .................. C08K 5/0025
                                                              260/DIG. 31
3,404,134 A * 10/1968 Rees ............................. 525/362
(Continued)

FOREIGN PATENT DOCUMENTS

| JP | H06316025 | 11/1994 |
|---|---|---|
| JP | 2790054 | 8/1998 |

(Continued)

OTHER PUBLICATIONS

Zinc Acetylacetonate NPL document, retrieved Nov. 7, 2016.*
(Continued)

*Primary Examiner* — Michael B Nelson
(74) *Attorney, Agent, or Firm* — Seyfarth Shaw LLP

(57) ABSTRACT

The present invention provides as steam barrier resin, a steam barrier coating agent, a steam barrier film, and a steam barrier laminate that exhibit an improved steam barrier property. The steam barrier resin is obtained by reacting a carboxylic acid group and/or an acid anhydride group of a copolymer (C) with an organometallic complex (D). The copolymer (C) is obtained by polymerizing an unsaturated hydrocarbon monomer (A) and an unsaturated carboxylic acid and/or an unsaturated dicarboxylic anhydride (B). Further, the steam barrier resin includes metal bridging between the copolymers (C). The steam barrier coating agent contains the steam barrier resin and a solvent (B). The steam barrier film of the present invention is a film containing the steam barrier. The steam barrier laminate is obtained by laminating the steam barrier film of the present invention on at least one surface of a substrate film.

8 Claims, No Drawings

(51) Int. Cl.
    *C08F 210/00*     (2006.01)
    *C09D 5/00*     (2006.01)
    *B32B 27/24*     (2006.01)
    *B32B 27/28*     (2006.01)
    *B32B 27/30*     (2006.01)
    *B32B 27/34*     (2006.01)
    *C08F 222/06*     (2006.01)
    *C08J 7/04*     (2006.01)
    *C08F 8/42*     (2006.01)
    *C08F 4/34*     (2006.01)

(52) U.S. Cl.
    CPC ........ *C08J 2367/02* (2013.01); *C08J 2423/26* (2013.01); *C08J 2435/00* (2013.01); *Y10T 156/10* (2015.01); *Y10T 428/31786* (2015.04)

(56) References Cited

U.S. PATENT DOCUMENTS 4,358,573 A * 11/1982 Verbrugge ............ C08F 222/06
    526/272
4,849,489 A * 7/1989 Benhamou ............... B01J 19/18
    526/208
2006/0211809 A1* 9/2006 Kodemura et al. .......... 524/502
2009/0181244 A1* 7/2009 Fukugami ............... B32B 27/08
    428/336

FOREIGN PATENT DOCUMENTS

| JP | H10237180 | | 9/1998 |
|---|---|---|---|
| JP | 2000063752 | | 2/2000 |
| JP | 2002173631 | | 6/2002 |
| JP | 2005-330303 | * | 12/2005 |
| JP | 2007092052 | | 4/2007 |

OTHER PUBLICATIONS

Machine translation of JP 2005-330303, retrieved Jun. 22, 2018.*
Extended European Search Report issued in European Patent Application No. 13738224.8 dated Nov. 9, 2015.
Office Action issued in counterpart Taiwanese Patent Application No. 102102033 dated Mar. 25, 2016.
Revised Edition Handbook of Radical Polymerization, Sep. 10, 2010, pp. 320-323, Takashi Yoshida, NTS Inc., Tokyo, Japan.

* cited by examiner

STEAM BARRIER RESIN, STEAM BARRIER COATING AGENT, STEAM BARRIER FILM, AND STEAM BARRIER LAMINATE

This application is a National Stage of PCT/JP2013/000130, filed Jan 15, 2013, which claims priority to Japanese Patent Application No. 2012-009922, filed Jan. 20,2012, the disclosures of each of which are incorporated herein by reference in its entirety.

TECHNICAL FIELD

The present invention relates to a steam barrier resin and a steam barrier coating agent, a steam barrier film, and a steam barrier laminate using the same.

BACKGROUND ART

In related arts, generally a metallic foil is used as a gas barrier layer in order to contribute to a barrier property against gas such as steam or the like.

In recent years, a gas barrier film including a deposited layer that is obtained by forming an inorganic oxide such as silicon oxide or aluminium oxide on a substrate film by the vacuum deposition method has been attracting attention. As the substrate film, For example, a biaxially-oriented polyester film that is excellent in translucency and rigidity is used.

In the above-mentioned gas barrier film, the deposited layer tends to be weak against friction and the like during usage. Therefore, when the gas barrier film is developed for various applications, a minute crack is generated in the deposited layer due to friction or stretching at the time of lamination, printing, filling of a content or the like, thereby possibly causing a gas barrier property to deteriorate.

Patent Documents 1 to 4 disclose a technique for laminating a coating layer on a deposited layer in order to protect the deposited layer.

Patent Document 1 discloses a gas barrier film in which a polyvinyl alcohol resin layer is laminated on a metal or a metal oxide that is formed on a surface of a substrate film (Claim 1).

Patent Document 2 discloses a gas barrier film that is framed by laminating, on a substrate film, a deposited layer consisting of an inorganic compound, which is referred to as a first layer, and a gas bather film that is formed through coating a coating agent containing a water-soluble polymer, alkoxide, hydrolysate thereof, or tin chloride, and drying by heating the gas barrier film, which is referred to as a second layer (claim 1).

Patent Document 3 discloses a coating composite for gas barrier that mainly consists of a particular organosilane and a particular silyl group-containing fluorine series polymer (Claim 1).

Patent Document 3 further discloses a was barrier film that is obtained by laminating, on a substrate film, a deposited layer consisting of a metal and/or an inorganic compound and a coating film formed of the above-mentioned coating composite (claim 11).

Patent Document 4 discloses a gas barrier coating composite containing a polyvinyl alcohol-based resin and a particular metal alcoholate (claim 1).

Patent Document 4 further discloses a gas barrier film obtained by laminating a coating film formed from the above-mentioned gas barrier coating composite on a substrate film (claim 10).

Further, Patent Document 5 discloses a method of manufacturing a gas barrier film that includes steps of (1) forming a film-like object of a composite that mainly consists of poly(meth)acrylic acid and a polyalcohol polymer, (2) applying a heat treatment on the film-like object, and (3) immersing the heat-treated film-like object in a medium containing metal (claim 15).

Patent Document 6 discloses a gas barrier film consisting of a polymer of unsaturated carboxylic compound multivalent metal salt containing a modified vinyl alcohol polymer (claim 1).

CITATION LIST

Patent Literature

Patent Document 1: Japanese Unexamined Patent Application Publication No. 1106-316025
Patent Document 2: Japanese Patent No. 2790054
Patent Document 3: Japanese Unexamined Patent Application Publication No, 2000-63752
Patent Document 4: Japanese Unexamined Patent Application Publication No, 2002-173631
Patent Document 5: Japanese Unexamined Patent Application Publication No. H10-237180
Patent Document, 6: Japanese Unexamined Patent Application Publication No. 2007-092052

SUMMARY OF INVENTION

Technical Problem

However, the coating film containing an alkoxide or the like that is disclosed in Patent Literatures 1 to 4 is poor in toughness, and depending on usage conditions, a gas barrier property of the gas barrier film may deteriorate due to a crack in the film. Further, in a gas barrier film using a water-soluble polymer or a highly polar polymer (e.g., a polyalcohol polymer and an acrylic resin) that is disclosed in Patent Literatures 1 to 6, the polymer has a hydrophilic property, thereby preventing the was barrier film from exhibiting a high steam barrier property.

An object of the present invention is to provide a steam bather resin that is capable of forming a steam barrier film having an improved steam barrier property and a steam barrier coating agent, a stem, barrier film, and a steam barrier laminate using the same.

Solution to Problem

A steam harrier resin of the present invention is obtained by reacting a carboxylic acid group and/or an acid anhydride group of a copolymer (C) with an organometallic complex (D), in which the copolymer (C) is obtained by polymerizing an unsaturated hydrocarbon monomer (A) and an unsaturated carboxylic acid and/or an unsaturated dicarboxylic anhydride (B). Further, the steam barrier resin includes metal bridging between the copolymers (C).

In the copolymer (C), an average value of carbon numbers between two parts derived from the unsaturated carboxylic acid and/or the unsaturated dicarboxylic anhydride (B) that are adjacent to each other is preferably in the range of 11 to 80.

An acid value of the copolymer (C) is preferably 5 to 470 mgKOH/g.

A steam barrier coating agent according to the present invention contains the steam barrier resin according to the present invention and a solvent (E).

The steam barrier film of the present invention is a film containing the above-mentioned steam barrier resin of the present invention.

The steam barrier laminate of the present invention is obtained by laminating the above-mentioned steam barrier film of the present invention on at least one side of a substrate film.

Advantageous Effects of Invention

According to the present invention, it is possible to provide a steam barrier resin that is capable of forming a steam barrier film having an improved steam barrier property and a steam bather agent, a steam barrier film, and a steam barrier laminate using the same.

DESCRIPTION OF EMBODIMENTS

"Steam Barrier Resin"

A steam barrier resin of the present invention is obtained by reacting a carboxylic acid group and/or an acid anhydride group of a copolymer (C) with an organometallic complex (D), in which the copolymer (C) is obtained by polymerizing an unsaturated hydrocarbon monomer (A) and an unsaturated carboxylic acid and/or an unsaturated dicarboxylic anhydride (B), and the steam bather resin includes metal bridging between copolymers (C).

(Unsaturated Hydrocarbon Monomer (A))

The unsaturated hydrocarbon monomer (A) of the present invention is an unsaturated hydrocarbon having one or more carbon-to-carbon double bonds. The unsaturated hydrocarbon monomer (A) is not especially limited, but examples of the unsaturated dicarboxylic anhydride are an α-olefin, a β-olefin, a cyclic olefin, a diem and a triene, having a carbon number of 2 to 100. These compounds may be used independently or two or more kinds of the compounds may be used. Among the above-mentioned compounds, an α-olefin having a carbon number of 11 to 80 is especially preferable as it achieves a favorable property in terms of a steam barrier property, a coating property, and preservation stability.

(Unsaturated Carboxylic Acid and/or Unsaturated Dicarboxylic Anhydride (B))

As the unsaturated carboxylic acid and/or the unsaturated dicarboxylic anhydride (B) in the present invention, there are, for example:

an unsaturated monocarboxylic acid such as acrylic acid, methacrylic acid, oleic acid, linoleic acid, arachidonic acid, docosahexaenoic acid, eicosapentaenoic acid, and fumaric acid;

an unsaturated dicarboxylic acid such as maleic acid and itaconic acid; and an unsaturated dicarboxylic anhydride such as maleic anhydride, methylmaleic anhydride, and 2,3-dimethylmaleic anhydride, 3,4,5,6-tetrahydrophthalic anhydride, bicyclo[2.2.2]oct-7-ene-2,3,5,6-tetracarboxylic dianhydride, bicyclo[2.2.2]oct-5-ene-2,3-dicarboxylic anhydride, cis-4-cyclohexene-12-dicarboxylic anhydride, and 5-norbornene-2,3-dicarboxylic anhydride.

These compounds may be used independently or two or more kinds of the compounds may be used.

Among the above-mentioned compounds, an unsaturated dicarboxylic anhydride, especially maleic anhydride, is preferable because it achieves a favorable result in terms of solvent (Copolymer (C))

A copolymer (C) of the present invention is a copolymer obtained by polymerizing, at least, the above-mentioned unsaturated hydrocarbon monomer (A) and the above-mentioned unsaturated carboxylic acid and/or the unsaturated dicarboxylic anhydride (B). At the time of the polymerization, a monomer other than the above compounds (A) and (B) may be added as a polymerization component.

When the acid value of the copolymer (C) is too small, sufficient metal bridging cannot be formed at the time of reacting with the organometallic complex (D), thereby possibly reducing the steam barrier property of the obtained steam barrier resin.

When the acid value of the copolymer (C) is too large, crosslink density of the steam barrier resin obtained from the reaction with the organometallic complex (D) may become higher, causing poor preservation stability, gelation, or deterioration of the solvent solubility.

The acid value of the copolymer (C) is preferably in the range of 5 to 470 mgKOH/g, more preferably in the range of 90 to 350 mgKOH/g, and further preferably in the range of 100 to 250 mgKOH/g.

The "acid value" in this specification is compliant with JIS K 0070 potentiometric titration and is a value obtained by converting the measured acid value (mgKOH/g) into a solid content.

The polymerization method of the copolymer (C) is not especially limited, but the solution polymerization method or the bulk polymerization method is preferable.

Preferably, a plurality of kinds of monomeric components containing the unsaturated hydrocarbon monomer (A) and the unsaturated carboxylic acid and/or the unsaturated dicarboxylic anhydride (B) are reacted in the presence of a polymerization initiator and in an inert gas flow.

The polymerization reaction may be performed in the presence of a solvent.

The polymerization temperature, the polymerization time, and the polymerization concentration differ according to a type and a ratio of monomeric components which will be used, a molecular weight of a target polymer and the like. Preferably, the polymerization temperature is in the range of 50 to 250° C., the polymerization time is two to ten hours, and the polymerization concentration is 30% or greater.

The "polymerization concentration" is defined by the following expression.

Polymerization concentration(%)=[Total mass of monomeric component/(Total mass of monomeric component+Solvent mass)]×100

As the polymerization initiator used for synthesis of the copolymer (C), there are, for example, an organic peroxide and an azo compound.

As the organic peroxide, there are, for example, benzoyl peroxide, cumene hydroperoxide, t-butyl hydroperoxide, diisopropyl peroxydicarbonate, di-t-butyl hydroperoxide, and t-butyl peroxybenzoate. Further, as the azo compound, there are, for example, an azo compound such as 2,2'-azodiisobutyronitrile.

The polymerization initiator is preferably used in the range of 0.5 to 20 pts. mass per 100 pts, mass of the unsaturated hydrocarbon monomer (A).

As the solvent used for synthesis of the copolymer (C), there are, for example, water, a water miscible organic solvent, an acetic ester, a keton, toluene, xylene, ethylbenzene.

As the water miscible organic solvent, there are, for example:

an alcohol solvent such as ethyl alcohol, isopropyl alcohol, and n-propyl alcohol; and mono- or di-alkyl ether such as ethylene glycol and diethylene glycol.

As the acetic ester, there are, for example, ethyl cellosolve acetate and propylene glycol monomethylether acetate.

As the keton, there are, for example, cyclohexanone and methyl isobutyl ketone.

In the copolymer (C), an average value of the carbon numbers between two parts derived from the unsaturated carboxylic; acid and/or the unsaturated dicarboxylic anhydride (B) that are adjacent to each other is an index indicating the degree of a hydrophobic property.

When the average value is too small, the hydrophobic property of the steam barrier resin will be insufficient, possibly causing deterioration of the steam barrier property.

When the average value is too large, the hydrophobic property of the steam barrier resin will be too large and the solvent solubility will deteriorate, possibly causing deterioration of the coating property and the preservation stability.

In the copolymer (C), the average value of the carbon numbers between two parts derived flour the unsaturated carboxylic acid and/or the unsaturated dicarboxylic anhydride (B) that are adjacent to each other is preferably in the range of 11 to 80, and more preferably, in the range of 28 to 80.

When the copolymer (C) is a copolymer consisting only of the unsaturated hydrocarbon monomer (A) and the unsaturated carboxylic acid and/or the unsaturated dicarboxylic anhydride (B), "the carbon number between two parts derived from the unsaturated carboxylic acid and/or the unsaturated dicarboxylic anhydride (B) that are adjacent to each other" is equivalent to the carbon number of a part derived from the unsaturated hydrocarbon monomer (A) between the two parts derived, from the unsaturated carboxylic acid and/or the unsaturated dicarboxylic anhydride (B).

For example, when maleic anhydride and a-hexene (carbon number of 6) are polymerized at a molar ratio of 1:1, in the copolymer (C), "the carbon number between two parts derived from unsaturated carboxylic acid and/or the unsaturated dicarboxylic anhydride (B) that are adjacent to each other" will be six, which is the carbon number of a part derived from α-hexene.

A unit molecular weight (X) of the copolymer (C) is obtained from the acid value of the copolymer (C), and thus the average value of "the carbon numbers between two parts derived from the unsaturated carboxylic acid and/or the unsaturated dicarboxylic anhydride (B) that are adjacent to each other" can be calculated.

The unit molecular weight (X) is a molecular weight of a repeating unit and can be calculated by the following expression.

The unit molecular weight($X$)=1000×(molecular weight of KOH)×(equivalent amount to acid value per unit)/(acid value KOH mg/g)

By subtracting a molecular weight of the part derived from the unsaturated carboxylic acid and/or unsaturated dicarboxylic anhydride (B) in one unit from the unit molecular weight (X) that is calculated by this expression, and dividing the obtained value by a molecular weight ($CH_2$: 14.03) of a methylene chain, the average value of "the carbon numbers between two parts derived from the unsaturated carboxylic acid and/or the unsaturated dicarboxylic anhydride (B) that are adjacent to each other" is calculated.

The copolymer (C) may be used independently or two or more kinds of compounds may be used.

In terms of the steam barrier property, the coating property, and the preservation stability, it is preferable to use a copolymer, in which the carbon number between the two parts derived from unsaturated carboxylic acid and/or the unsaturated dicarboxylic anhydride (B) that are adjacent to each other is in the range of 11 to 27, together with a copolymer, in which the carbon number between the two parts derived from the unsaturated carboxylic acid and/or the unsaturated dicarboxylic anhydride (B) that are adjacent to each other is in the range of 28 to 80.

(Organometallic Complex (D))

As a metal bridging method, the neutralization method using an inorganic compound such as a metal carboxylate, a hydroxide or the like is generally known. However, as the compatibility between those inorganic compounds and resin having a strong hydrophobic property is poor, sufficient metal bridging cannot be achieved, thereby deteriorating the steam barrier property. Therefore, in the present invention, metal bridging is performed using the organometallic complex (D) having good compatibility with the copolymer (C) and a solvent.

The organometallic complex (D) consists of a metal element belonging to groups 1 to 13 and any ligand.

In order to achieve sufficient metal bridging, as the metal element in the organometallic complex (D), a divalent or higher-valent metal element belonging to groups 1 to 13 is preferable, and specifically, magnesium, calcium, copper, zinc, aluminium, titanium or the like is preferable.

As the ligand, there are, for example, acetylacetone chelate, hexafluoroacetylacetone chelate, trifluoroacetyl chelate, ethyl acetoacetate chelate, octylene glycol chelate, triethanolamine dictate, lactate chelate, ammonium lactate chelate, dialkyl carbamic acid chelate, ethylenediamine. In terms of availability, acetylacetone chelate and the like is preferable.

The "metal bridging" in this specification is formed by ion bonding, coordination bonding, or covalent bonding between a carboxyl group derived from unsaturated carboxylic acid in the copolymer (C) or a carboxyl group generated by hydrolysis of an acid anhydride group derived from unsaturated dicarboxylic anhydride and a metal freed from the organometallic complex (D).

The metal bridging may be formed inside one copolymer (C) molecule or formed between two or more copolymer (C) molecules.

As a method of thrilling the metal bridging, there is, for example, a method in which one or more kinds of copolymers (C), one or more kinds of organometallic complexes (D), and one or more kinds of solvents (B) as necessary, are mixed, heated and stirred, and dispersing processing or aging processing is performed.

Details of the solvent (E) shall be explained later.

For example, the following method is preferable.

A reaction solution containing the copolymer (C), the organometallic complex (D), and the solvent (E) is produced. At this time, a total concentration of the copolymer (C) and the organometallic complex (D) in the reaction solution is preferably in the range of 5 to 50 mass %.

Glass beads having 1 mm diameter or the like are added in the reaction solution, and dispersion processing is performed using a paint shaker or the like for about two to 20 hours. The addition amount of the glass beads is preferably in the range of 10 to 50 mass % based on a total amount 100 mass % of the above-mentioned solution and the glass beads.

The above-mentioned dispersion processing is performed, and then the aging processing is performed for about one to five hours in an oven at 80° C.

In the above-mentioned method, although a ratio of the copolymer (C) and the organometallic complex (D) may be any ratio, when the organometallic complex (D) is too little, the metal bridging may not proceed sufficiently, while when the organometallic complex (D) is too much, unreacted organometallic complex (D) may remain in a system, possibly leading to deterioration of the steam barrier property. Therefore, it is preferable to add an amount of organometallic complex (D) that is equivalent to the acid value of the copolymer (C) in terms of improvement of the steam barrier property.

When the bridging part inside the copolymer (C) is dicarboxylic anhydride, an anhydride ring opens by moisture and a carboxyl group is generated, and then bridging with a metal proceeds. In this case, although the anhydride ring opens sufficiently with moisture in the system, in order to further improve the efficiency, it is preferable to use the solvent (E) containing a polar solvent such as a small amount of water or alcohol.

According to the present invention, it is possible to provide a steam barrier resin that is capable of forming a steam barrier film having an improved steam barrier property.

In the steam barrier resin according to the present invention, by using the unsaturated hydrocarbon monomer (A) as a monomeric component of the copolymer (C), it is possible to improve the hydrophobic property of the resin and the coating property such as preventing a minute crack and the like, thereby enabling the steam barrier resin to exhibit an excellent steam barrier property.

Further, in the steam barrier resin of the present invention, by efficiently reacting the unsaturated carboxylic acid ardor the unsaturated dicarboxylic anhydride (B) in the copolymer, it is possible to firmly couple the copolymers (C) by the metal bridging to create an intense state, thereby enabling the steam bather resin to exhibit an excellent steam barrier property.

"Steam Barrier Coating Agent"

The steam barrier coating agent of the present invention contains the above-mentioned steam barrier resin and the solvent (E).

(Solvent (E))

The above-described steam barrier resin can be a steam barrier coating agent by adding the solvent (E) that can disperse or dissolve materials of the steam harrier resin.

As the solvent (E), water, a water miscible organic solvent, an acetic ester, a keton, hexane, heptane, octane, nonane, decane, cyclohexane, methylcyclohexane, toluene, xylene, or ethylbenzene can be used.

As the water miscible organic solvent, there are, for example:

an alcohol solvent such as methyl alcohol, ethyl alcohol, isopropyl alcohol, and n-propyl alcohol; and mono- or di-alkyl ether such as ethylene glycol and diethylene glycol.

As the acetic ester, there are, for example, ethyl acetate, ethyl cellosolve acetate, propylene glycol monomethylether acetate, and 1,4-dioxane.

As the keton, there are, for example, acetone, methyl ethyl ketone, cyclohexa one, and methyl isobutyl ketone.

A timing to add the solvent (E) may be any of at the time of synthesis of the copolymer (C); at the time of metal bridging (when the copolymer (C) and the organometallic complex (D) react); and after metal bridging (after the copolymer (C) and the organometallic complex (D) reacted).

The above-described steam barrier resin and solvent of the present invention can be mixed at any ratio.

The steam barrier coating agent of the present invention can contain any component other than the above-mentioned components.

The steam barrier coating agent of the present invention has a favorable coating property and preservation stability.

"Steam Barrier Film and Steam Barrier Laminate"

The steam barrier film of the present invention is a film containing the above-described steam barrier resin of the present invention.

The steam barrier laminate of the present invention is obtained by laminating the above-described steam harder film of the present invention on at least one side of a substrate film.

The substrate film of the present invention is preferably a thermoplastic resin film. The substrate film is preferably a biaxially-oriented film.

As the thermoplastic resin of the substrate film, there are, for example:

a polyolefin (polyethylene, polypropylene, poly4-methyl-1-pentene, polybutene or the like);

a cyclic olefin polymer;

a polyester (polyethylene terephthalate, polybutylene terephthalate, polyethylene naphtholate or the like);

a polyamide (nylon-6, nylon-6 6, and poly(m-xylene adipamide or the poly(phenylene sulfide), and a combination thereof.

Among these compounds, polypropylene, polyethylene terephthalate, a polyamide or the like is preferable as a film having a favorable stretch property, translucency, and rigidity can be obtained.

As the substrate film, to be more specific, there are, for example, a biaxially-oriented polyester film, a biaxially-oriented polypropylene film, and a biaxially-oriented polyamide film. Among these, a biaxially-oriented polyester film and a biaxially-oriented polypropylene film are preferable because they are excellent in acid resistance, rigidity, and translucency.

The substrate film may contain one, two or more of any compounds in the range not causing the effect of the present invention to be lost.

The substrate film may contain an ultraviolet absorber, an antioxidant, an antistatic agent, a surfactant, a pigment, a fluorescent brightener or the like. The substrate film may contain inorganic particles containing silica, calcium, carbonate, titanium oxide or the like or organic particles containing acrylic resin, styrene resin or the like.

As a method to laminate the steam harrier film on the substrate film, there are, for example:

a lamination method (P1) by coextrusion of resin used for the substrate film and the steam barrier resin used for the steam barrier film;

a method (P2) by laminating the steam barrier resin that is turned into a film on a substrate film using a hot press machine or the like; and a method (P3) by coating the steam barrier coating agent on the substrate film, and then removing the solvent (E).

The method (P3) is preferable in light of simplifying the processes and manufacturing uniform laminates.

As the coating method of the steam barrier coating agent, there are, for example:

a method of using a coating member such as a lot or a wire bar; or various coating methods such as, micro gravure coating, gravure coating, die coating, curtain coating, slot coating, cast coating, dip coating, or spin coating, can be used.

The thickness of the steam barrier film, is not especially limited, but the steam barrier film is preferably thin in terms of improving the flexibility.

The thickness of the steam barrier film can be adjusted by changing a solid content of the steam barrier coating agent or changing a type of the coating member such as a bar coater.

One or a plurality of layers of the steam barrier films can be laminated on one surface of the substrate film.

The steam barrier laminate can contain any organic layer or inorganic layer other than the steam barrier film. One or a plurality of such layers may be contained.

As a formation method of the organic layer or the inorganic layer, there are, for example, the deposition method and the coating method.

As a material of the organic layer, there are, for example, a polyvinyl alcohol, a polyolefin (e.g. polyethylene, polypropylene, poly4-methyl-1-pentene, polybutene), a cyclic olefin polymer, a polyester (e.g. polyethylene terephthalate, polybutylene terephthalate, and polyethylene naphthalate), a polyamide (e.g. nylon-6, nylon-66, and poly (m-xylene adipamide)), a poly (phenylene sulfide), and a polyimide. These compounds may be used independently or two or more kinds of the compounds may be used.

As a material of the inorganic layer, there are, for example, a metal such as chromium, zinc, cobalt, aluminium, tin, silicon or the like, or an oxide, a nitride, a nitric oxide, a sulfide, a phosphide or the like of the above-mentioned metal. These compounds may be used independently or two or more of the compounds may be used. Among these, an oxide such as aluminium oxide and silica (silicon oxide) or silicon nitrogen oxide is preferable.

When one or a plurality of layers of the steam barrier films and one or a plurality of layers of the organic layers or the inorganic layers are contained in one surface of the substrate film, a lamination order of these layers may be any lamination order.

According to the present invention, it is possible to provide a steam barrier film and a steam barrier laminate having an improved steam barrier property. The steam barrier film and the steam barrier laminate of the present invention have favorable flexibility.

EXAMPLES

Next, although the present invention shall be explained in more detail using examples, the present invention is not limited to these examples.

Firstly, a manufacturing example of the copolymer (C) and a copolymer (G) for comparison shall be explained.

Tables 1 and 2 describe a monomeric, component, an acid value, an average number of carbon numbers between two parts derived from the unsaturated carboxylic acid and/or the unsaturated dicarboxylic anhydride (B) that are adjacent to each other (the carbon number shall be abbreviated as "carbon number in-between" in Tables), and a mass-average molecular weight (Mw) of the copolymers (C) and (G) that are manufactured in manufacturing examples 1 to 6.

In the copolymers (C) and (G), the "acid value" and "the carbon number between two parts derived from the unsaturated carboxylic acid and/or the unsaturated dicarboxylic anhydride (B) that are adjacent to each other" were calculated by the above-mentioned method.

The mass-average molecular weight (Mw) is a value measured using Shodex GPC-101 (manufactured by Showa Denko K.K).

Manufacturing Example 1

In a 300 ml flask equipped with a mechanical stirrer and a nitrogen introduction pipe, 70.56 g of LINEALENE, 10 (manufactured by Idemitsu Co., Ltd.) and 63.74 g of maleic anhydride (manufactured by Tokyo Chemical Industry Co., Ltd.) were poured and dissolved in nitrogen at 150° C., After that, 0.69 g of di-t-butyl hydroperoxide was added little by little and reacted for five hours at 16° C. It was allowed to cool, and then the obtained reaction product was dissolved in 200 g of methyl ethyl ketone (MEK) and the solvent was removed by an evaporator. The obtained solid was dried overnight in a vacuum dryer at 80° C., and a copolymer (C1) was obtained.

Manufacturing Example 2

In a 300 ml flask equipped with a mechanical stirrer and a nitrogen introduction pipe, 78.55 g of LINEALENE 14 (manufactured by Idemitsu Co., Ltd.) and 50.99 g of maleic anhydride (manufactured by Tokyo Chemical Industry Co., Ltd.) were poured and dissolved in nitrogen at 150° C. After that, 0.49 g of di-t-butyl hydroperoxide was added little by little and reacted for five hours at 200° C. It was allowed to cool, and then the obtained reaction product was dissolved in 200 g of MEK and the solvent was removed by an evaporator. The obtained solid was dried overnight in a vacuum dryer at 80° C., and a copolymer (C2) was obtained.

Manufacturing Example 3

In a 300 ml flask equipped with a mechanical stirrer and a nitrogen introduction pipe, 88.37 g of LINEALENE 18 (manufactured by Idemitsu Co., Ltd.) and 44.62 g of maleic anhydride (manufactured by Tokyo Chemical Industry Co., Ltd.) were poured and dissolved in nitrogen at 150° C. After that, 0.42 g of di-t-butyl hydroperoxide was added little by little and reacted for five hours at 200° C. It was allowed to cool, and then the obtained reaction product was dissolved in 200 g of MEK and a solvent was removed by an evaporator. The obtained, solid was dried overnight in a vacuum dryer at 80° C., and a copolymer (C3) was obtained.

Manufacturing Example 4

In a 300 ml flask equipped with a mechanical stirrer and a nitrogen introduction pipe, 49.99 g of 1-docosene and 20.65 g of maleic anhydride (manufactured by Tokyo Chemical Industry Co., Ltd.) were poured and dissolved in nitrogen at 150° C. After that, 0.20 g of di-t-butyl hydroperoxide was added little by little and reacted for five hours at 200° C. It was allowed to cool, and then the obtained reaction product was dissolved in 200 g of MEK and the solvent was removed by an evaporator. The obtained solid was dried overnight in a vacuum dryer at 80° C., and a copolymer (C4) was obtained.

Manufacturing Example 5

In a 300 ml flask equipped with a mechanical stirrer and a nitrogen introduction pipe, 59.08 g of 1-hexacosene and 20.65 g of maleic anhydride (manufactured by Tokyo Chemical Industry Co., Ltd.) were poured and dissolved in nitrogen at 150° C. After that, 0.20 g of di-t-butyl hydroperoxide was added little by little and reacted for live hours at 200° C. It was allowed to cool, and then the obtained reaction product was dissolved in 200 g of MEK and the solvent was removed by an evaporator. The obtained solid was dried overnight in a vacuum dryer at 80° C., and a copolymer (C5) was obtained.

Manufacturing Example 6

In a 300 ml flask equipped with a mechanical stirrer and a nitrogen introduction pipe, 11.44 g of maleic anhydride (manufactured by Tokyo Chemical Industry Co., Ltd.) and 35 g of cyclohexanone were poured and dissolved in nitrogen at 80° C. After that, a solution containing 25.00 g of methyl methacrylate (manufactured by Tokyo Chemical Industry Co., Ltd.), 0.19 g of AIBN (manufactured by Tokyo Chemical Industry Co., Ltd.), and 30 g of cyclohexanone was dropped for 30 minutes and reacted for five hours at 80° C. It was allowed to cool, and then the obtained reaction product was dissolved in 200 g of MEK and the solvent was removed by an evaporator. The obtained solid was dried overnight in a vacuum dryer at 80° C., and a copolymer (G1) was obtained.

(Commercially-Available Copolymer)

Further, the following marketed products were prepared as the copolymer (C). Copolymer (C6): "DIACARNA 30" manufactured by Mitsubishi Chemical Corporation Copolymer (C7): "RIOFLEX 4188H—C" manufactured by TOYO INK MFG. CO., LTD. Copolymer (C8): "ISOBAM 600" manufactured by Kuraray Co., Ltd.

As for these copolymers, a monomeric component, an acid value, an average value of carbon numbers between two parts derived from the unsaturated carboxylic acid and/or the unsaturated dicarboxylic anhydride (B) that are adjacent to each other, and a mass-average molecular weight (Mw) are described.

The following compounds were prepared as the organ metallic complex (D),
(D1):Zn(II) Acetylacetonato,
(D2):Ca(II) Acetylacetonato,
(D3):Al(III) Acetylacetonato,
(D4):Ti(IV) Acetylacetonato,
(D5):Mg(II) Acetylacetonato,
(D6):Cu(II) Acetylacetonato,
(D7):Co(I) Acetylacetonato,
(D8): Ethylenediaminetetraacetic acid disodium zinc salt tetrahydrate (Clewat Zn manufactured by Nagase ChemteX Corporation)
(D9): Tris (trifluoro-2,4-pentanedionate)Al(III), and
(D10):Bis(hexafluoroacetylacetonato)Co(II).
<Manufacturing Steam Barrier Resin and Steam Barrier Coating Agent>

Example 1

In a 70 ml mayonnaise jar (M-70), 6 g of the copolymer (C6), 1.47 g of (equivalent amount to acid value of the copolymer) of the organometallic complex (D1), 21.5 g of a mixed solvent (toluene/ethanol/water 16.8/4.2/0.5 (mass ratio)), and 20 g of glass heads having 1 mm diameter were poured and dispersed and stirred for twelve hours by a paint shaker (SO400 manufactured by Skandex). After that aging processing was performed for three hours in an oven at 80° C., impurities were removed by a nylon mesh of 200 mesh, and a steam barrier coating agent X1 containing a steam barrier resin and a solvent was obtained.

A formulation is shown in Table 3.

Examples 2 to 24

Steam barrier coating agents X2 to X24 containing a steam harrier resin and a solvent were manufactured in a method similar to the method in Example 1 except that the formulation is the one shown in Table 3.

Note that the amount of the glass beads having 1 mm diameter used in the dispersion processing is shown below.
<Amount of Glass Beads>
Examples 2 to 20: 20 g,
Example 21: 25 g, and
Examples 22 to 24: 15 g.
<Manufacturing Coating Agent>

Comparative Example 1

To 6 g of the copolymer (C6), 20 g of toluene was added, mixed and dissolved, and a coating agent Y1 was obtained.

Comparative Example 2

In a 70 ml mayonnaise jar (M-70), 6 g of the copolymer (C6), 0.70 g (equivalent amount to acid value of the copolymer) of zinc carbonate (II), 19 g of a mixed solvent (toluene/ethanol/water=16.8/4.2/0.5), and 20 g of glass beads having 1 mm diameter were poured and dispersed and stirred for twelve hours by Skandex. After that, aging processing was performed for three hours in an oven at 80° C., impurities were removed by a nylon mesh of 200 mesh, and a coating agent Y2 was obtained.

Comparative Example 3

In a 70 ml mayonnaise jar (M-70), 6 g of the copolymer (C8), 0.99 g of zinc hydroxide (II), 26 g of a 25% ammonia aqueous solution, and 20 g of glass beads having 1 mm diameter were poured and dispersed and stirred for twelve hours by Skandex, impurities were removed by a nylon mesh of 200 mesh, and a coating agent Y3 was obtained, Comparative Example 4

In a 70 ml mayonnaise jar (M-70), 6 g of the copolymer (G1), 5.22 g of (equivalent amount to acid value of the copolymer) of zinc (III) acetylacetonate, 31 g of a mixed solvent toluene/ethanol/water=16.8/4.2/0.5), and 20 g of glass beads having 1 ram diameter were poured and dispersed and stirred for twelve hours by Skandex, aging processing was performed for three hours in an oven at 80 impurities were removed by a nylon mesh of 200 mesh, and a coating agent Y4 was obtained.

Comparative Examples 5 and 6

Coating agents Y5 and Y6 were manufactured by a method similar to the method in Comparative Example 1 except that the copolymer (C) was changed.

Formulations in Comparative Examples 1 to 6 are shown in Table 4,
<Manufacturing Steam Barrier Laminate>

Example 25

The steam barrier coating agent X1 was coated on a PET film (manufactured by Toyobo Co., Ltd. A4100) having 100

μn thickness using a bar coater (No. 30), the coated PET film was dried in an oven at 140° C. for two minutes, and a steam barrier laminate L1 was obtained.

Main manufacturing conditions are shown in Table 5.

Examples 26 to 51

Steam barrier laminates L2 to L27 were manufactured by a method similar to the method in Example 25 except that a steam barrier coat agent, a substrate, and a bar coater were replaced by the ones shown in Table 5.
<Manufacturing Laminate>

Comparative Examples 7 to 12

Laminates M1 to M6 were manufactured by a method similar to the method in Example 25 except that any one of the coating agents Y1 to Y6 was used instead of the steam barrier coating agent X1, and a substrate and a bar coater were replaced by the ones shown in Table 6.

Abbreviations in Tables 5 and 6 shall be explained below.
PET: a PET film having 100 μm, and
$SiO_2$/PET: a film obtained by depositing an $SiO_2$ film having 12 μm thickness on a PET film having 100 μm thickness (TECHBARRIER LX manufactured by Mitsubishi Plastics Inc).
(Evaluation)

The following evaluation was performed on the steam barrier coating agents or the coating agents and the steam barrier laminates or the laminates that were manufactured in Examples and Comparative Examples.
(Preservation Stability)

The steam harrier coating agents X1 to X24 and the coating agents Y1 to Y6 that were manufactured in Examples 1 to 24 and Comparative Examples 1 to 6 were allowed to stand for one day to observe the preservation stability (whether or not gelation occurs). The preservation stability was evaluated according to the following references. Evaluation results are shown in Tables 3 and 4.
○ (Good): (remained in a dissolved state and can be coated)
Δ (Fair): (gelled but dissolved after aging processing at 50° C., and can be coated)
x (Poor): (gelled and in a solid state after aging processing at 50° C.)
(Steam Barrier Property)

A moisture vapor transmission rate was measured on the steam barrier laminates L1 to L27 and the laminates M1 to M6 that were manufactured in Examples 25 to 51 and Comparative Examples 7 to 12 using a moisture vapor transmission rate measurement apparatus (PERMATRAN manufactured by MOCON) under the condition of 40° C.-100% RH. The obtained actual measured values were calculated into converted values where the thickness was 100 μm. The steam barrier property was evaluated according to the following references. Evaluation results are shown in Tables 5 and 6.
○○ (Excellent): Steam transmission rate is less than 1 g/(m$^2$·day),
○ (Good): Steam transmission rate is greater than or equal to 1 g/(m$^2$·day) and less than 10 g/(m$^2$·day),
Δ (Fair) Steam transmission rate is greater than or equal to 10 g/(m$^2$·day) and less than 100 g/(m$^2$·day), and
x (Poor): No harrier property (no change from a steam barrier property of a substrate)
(Coating Property)

Appearances of the steam barrier laminates L1 to L27 and the laminates M1 to M6 that were manufactured in Examples 25 to 51 and Comparative Examples 7 to 12 were observed, and a coating property of them was evaluated according to the following references. Evaluation results are shown in Tables 5 and 6.
○ (Good): Good,
Δ (Fair): Uneven,
x (Poor): Cracked or peeled off
(Flexibility)

The steam barrier laminates L1 to L27 and the laminates M1 to M6 that were manufactured in Examples 25 to 51 and Comparative Examples 7 to 12 were wound around bars with different diameters, and then a state of the films was observed. The flexibility was evaluated according to the following references. Evaluation results are shown in Tables 5 and 6.
○ (Good): Diameter of less than 10 ram, no crack or peeling off.
Δ (Fair): Diameter of greater than or equal to 10 mm and less than 20 mm, and no crack or peeling off, and
x (Poor): Diameter of 20 mm, cracked or peeled off.
(Result)

All of the steam barrier coating agents X1 to X24 that were manufactured in Examples 1 to 24 exhibit favorable preservation stability. All of the steam barrier laminates L1 to L27 that were manufactured in Examples 25 to 51 exhibit a favorable steam barrier property, coating property, and flexibility.

In the comparison between Examples 25 to 27 and Comparative Example 7, the steam barrier laminates L1 to L3 with metal bridging exhibited an improved steam barrier property in comparison to the laminate M1 with no metal bridging. The steam barrier laminate L1 in which an addition amount of the metallic complex is equivalent to an acid value of the copolymer exhibited an improved steam barrier property in comparison to the steam harrier laminate L2 and the steam barrier laminate L3.

In the comparison between Example 28 and Comparative Example 11, the steam barrier laminate L4 with metal bridging exhibited an improved steam barrier property in comparison to the laminate M5 with no metal bridging.

In the comparison between Example 40 and Comparison Example 12, the steam bather laminate L16 with metal bridging exhibited an improved steam harrier property in comparison to the laminate M6 with no metal bridging.

In the comparison between Examples 25 to 42 and Comparison Examples 8 and 9, the steam barrier laminates L1 to L18 with bridging by the organometallic complex (D) exhibited an improved steam barrier property in comparison to the laminates M2 and M3 that were bridged by an inorganic metal compound.

In the comparison between Examples 25 to 44 and Comparison Example 10, the steam barrier laminates L1 to L20 using the unsaturated hydrocarbon monomer (A) exhibited an improved steam barrier property and coating property in comparison to the laminate M4 that did not use the unsaturated hydrocarbon monomer (A).

In Example 44 where a three-layered structure of steam barrier film/inorganic film (silica film)/PET film was produced, a high steam barrier property was exhibited without the coating property being lost.

From the above results, it is seen that the steam barrier resin, the steam barrier coating agent, and the steam barrier laminate of the present invention exhibited a favorable steam barrier property.

The steam barrier resin and the steam barrier coating agent of the present invention exhibited a favorable coating property and preservation stability.

The steam barrier laminate of the present invention was proven to have favorable flexibility.

TABLE 1

| COPOLYMER (C) | UNSATURATED HYDROCARBON (A) | UNSATURATED CARBOXYLIC ACID AND/OR UNSATURATED DICARBOXYLIC ANHYDRIDE (B) | ACID VALUE (mgKOH/g) | CARBON NUMBER IN-BETWEEN (AVERAGE) | Mw |
|---|---|---|---|---|---|
| (C1) | $CH_2=CH-C_8H_{17}$ | MALEIC ANHYDRIDE | 467 | 10 | 7954 |
| (C2) | $CH_2=CH-C_{12}H_{25}$ | MALEIC ANHYDRIDE | 379 | 14 | 7938 |
| (C3) | $CH_2=CH-C_{16}H_{33}$ | MALEIC ANHYDRIDE | 320 | 18 | 8662 |
| (C4) | $CH_2=CH-C_{20}H_{41}$ | MALEIC ANHYDRIDE | 276 | 22 | 8466 |
| (C5) | $CH_2=CH-C_{24}H_{49}$ | MALEIC ANHYDRIDE | 241 | 26 | 8531 |
| (C6) | $CH_2=CH-C_nH_{2n+1}$, n = 28-60 | MALEIC ANHYDRIDE | 104 | 70 | — |
| (C7) | PROPYLENE | MALEIC ANHYDRIDE | 7.45 | 1068 | — |
| (C8) | isobutylene | MALEIC ANHYDRIDE | 248.8 | 25 | 6000 |

TABLE 2

| COPOLYMER (G) | UNSATURATED HYDROCARBON | UNSATURATED CARBOXYLIC ACID AND/OR UNSATURATED DICARBOXYLIC ANHYDRIDE (B) | ACID VALUE (mgKOH/g) | CARBON NUMBER IN-BETWEEN (AVERAGE) | Mw |
|---|---|---|---|---|---|
| (G1) | METHYL METHACRYLATE | MALEIC ANHYDRIDE | 374 | 14 | 9673 |

TABLE 3

| EXAMPLE | STEAM BARRIER COATING AGENT | COPOLYMER (C) TYPE | MASS/g | TYPE | MASS/g | ORGANOMETALLIC COMPLEX (D) TYPE | MASS/g | EQUIVALENT AMOUNT TO ACID VALUE | SOLVENT (E) TYPE & MASS RATIO | MASS/g | PRESERVATION STABILITY |
|---|---|---|---|---|---|---|---|---|---|---|---|
| 1 | X1 | (C6) | 6 | — | — | (D1) | 1.47 | 1.00 | TOLUENE/ETHANOL/WATER = 16.8/4.2/0.5 | 21.5 | Δ |
| 2 | X2 | (C6) | 6 | — | — | (D1) | 0.74 | 0.50 | TOLUENE/ETHANOL/WATER = 15.5/4.2/0.5 | 19.0 | Δ |
| 3 | X3 | (C6) | 6 | — | — | (D1) | 2.93 | 2.00 | TOLUENE/ETHANOL/WATER = 16.8/4.2/0.5 | 25.0 | Δ |
| 4 | X4 | (C1) | 5 | — | — | (D1) | 6.64 | 1.01 | TOLUENE/ETHANOL/WATER = 16.8/4.2/0.5 | 34.0 | Δ |
| 5 | X5 | (C2) | 6 | — | — | (D1) | 5.37 | 1.01 | TOLUENE/ETHANOL/WATER = 16.8/4.2/0.5 | 31.0 | Δ |

TABLE 3-continued

| EX-AMPLE | STEAM BARRIER COATING AGENT | COPOLYMER (C) TYPE | MASS/g | TYPE | MASS/g | ORGANOMETALLIC COMPLEX (D) TYPE | MASS/g | EQUIVALENT AMOUNT TO ACID VALUE | SOLVENT (E) TYPE & MASS RATIO | MASS/g | PRESERVATION STABILITY |
|---|---|---|---|---|---|---|---|---|---|---|---|
| 6 | X6 | (C3) | 6 | — | — | (D1) | 4.51 | 1.00 | TOLUENE/ETHANOL/WATER = 16.8/4.2/0.5 | 29.0 | ○ |
| 7 | X7 | (C4) | 6 | — | — | (D1) | 3.89 | 1.00 | TOLUENE/ETHANOL/WATER = 16.8/4.2/0.5 | 27.0 | ○ |
| 8 | X8 | (C5) | 6 | — | — | (D1) | 3.41 | 1.00 | TOLUENE/ETHANOL/WATER = 16.8/4.2/0.5 | 25.0 | ○ |
| 9 | X9 | (C6) | 1.5 | (C2) | 1.5 | (D1) | 1.71 | 1.00 | TOLUENE/ETHANOL/WATER = 16.8/4.2/0.5 | 14.0 | ○ |
| 10 | X10 | (C6) | 6 | — | — | (D2) | 1.33 | 1.00 | TOLUENE/ETHANOL/WATER = 16.8/4.2/0.5 | 20.5 | ○ |
| 11 | X11 | (C6) | 6 | — | — | (D1) | 1.20 | 1.00 | TOLUENE/ETHANOL/WATER = 16.8/4.2/0.5 | 20.0 | Δ |
| 12 | X12 | (C6) | 6 | — | — | (D4) | 1.95 | 1.00 | TOLUENE/ETHANOL/WATER = 16.8/4.2/0.5 | 19.5 | Δ |
| 13 | X13 | (C6) | 6 | — | — | (D5) | 1.24 | 1.00 | TOLUENE/ETHANOL/WATER = 16.8/4.2/0.5 | 20.0 | ○ |
| 14 | X14 | (C6) | 6 | — | — | (D6) | 1.45 | 1.00 | TOLUENE/ETHANOL/WATER = 16.8/4.2/0.5 | 21.0 | ○ |
| 15 | X15 | (C6) | 6 | — | — | (D7) | 1.43 | 1.00 | TOLUENE/ETHANOL/WATER = 16.8/4.2/0.5 | 21.0 | ○ |
| 16 | X16 | (C6) | 6 | — | — | (D8) | 2.20 | 0.99 | TOLUENE/ETHANOL/WATER = 16.8/4.2/0.5 | 24.0 | ○ |
| 17 | X17 | (C6) | 6 | — | — | (D9) | 2.70 | 1.00 | TOLUENE/ETHANOL/WATER = 16.8/4.2/0.5 | 24.0 | ○ |
| 18 | X18 | (C6) | 6 | — | — | (D10) | 2.66 | 1.01 | TOLUENE/ETHANOL/WATER = 16.8/4.2/0.5 | 24.0 | ○ |
| 19 | X19 | (C7) | 2.4 | — | — | (D1) | 0.10 | 1.19 | PROPYLENE GLYCOL MONOMETHYLETHER ACETATE | 21.6 | ○ |
| 20 | X20 | (C6) | 6 | — | — | (D1) | 1.47 | 1.00 | TOLUENE/ETHANOL/WATER = 26.2/6.3/0.75 | 32.5 | ○ |
| 21 | X21 | (C6) | 6 | — | — | (D1) | 1.47 | 1.00 | TOLUENE | 42.0 | ○ |
| 22 | X22 | (C6) | 1.5 | (C2) | 1.5 | (D1) | 1.71 | 1.00 | TOLUENE | 25.0 | ○ |
| 23 | X23 | (C6) | 1.5 | (C2) | 1.5 | (D1) | 1.71 | 1.00 | TOLUENE/ISOPROPYL ALCOHOL = 15/10 | 25.0 | ○ |
| 24 | X24 | (C6) | 1.5 | (C2) | 1.5 | (D1) | 1.71 | 1.00 | TOLUENE/1,4-DIOXANE = 20/5 | 25.0 | ○ |

TABLE 4

| COMPARATIVE EXAMPLE | COATING AGENT | COPOLYMER(C)/(G) TYPE | COPOLYMER(C)/(G) MASS/g | ORGANOMETALLIC COMPLEX (D)/METAL COMPOUND TYPE | ORGANOMETALLIC COMPLEX (D)/METAL COMPOUND MASS/g | ORGANOMETALLIC COMPLEX (D)/METAL COMPOUND EQUIVALENT AMOUNT TO ACID VALUE | SOLVENT (E) TYPE & MASS RATIO | SOLVENT (E) MASS/g | PRESERVATION STABILITY |
|---|---|---|---|---|---|---|---|---|---|
| 1 | Y1 | (C6) | 6 | — | — | — | TOLUENE | 20.0 | Δ |
| 2 | Y2 | (C6) | 6 | ZINC CARBONATE (II) | 0.70 | 1.00 | TOLUENE/ETHANOL/WATER = 16.8/4.2/0.5 | 19.0 | Δ |
| 3 | Y3 | (C8) | 6 | ZINC HYDROXIDE (II) | 0.99 | — | 25% AMMONIA AQUEOUS SOLUTION | 26.0 | ○ |
| 4 | Y4 | (G1) | 6 | (D1) | 5.22 | 1.00 | TOLUENE/ETHANOL/WATER = 16.8/4.2/0.5 | 31.0 | Δ |
| 5 | Y5 | (C1) | 6 | — | — | — | TOLUENE | 20.0 | Δ |
| 6 | Y6 | (C7) | 6 | — | — | — | TOLUENE | 20.0 | Δ |

TABLE 5

| EXAMPLE | STEAM BARRIER LAMINATE | STEAM BARRIER COATING AGENT | SUBSTRATE | BAR COATER | STEAM BARRIER PROPERTY | COATING PROPERTY | FLEXIBILITY |
|---|---|---|---|---|---|---|---|
| 25 | L1 | X1 | PET | No. 30 | ○○ | ○ | Δ |
| 26 | L2 | X2 | PET | No. 30 | ○ | ○ | Δ |
| 27 | L3 | X3 | PET | No. 30 | ○ | Δ | Δ |
| 28 | L4 | X4 | PET | No. 30 | ○ | Δ | Δ |
| 29 | L5 | X5 | PET | No. 30 | ○ | Δ | Δ |
| 30 | L6 | X6 | PET | No. 30 | ○ | Δ | Δ |
| 31 | L7 | X7 | PET | No. 30 | ○ | ○ | Δ |
| 32 | L8 | X8 | PET | No. 30 | ○ | ○ | Δ |
| 33 | L9 | X9 | PET | No. 30 | ○○ | ○ | Δ |
| 34 | L10 | X10 | PET | No. 30 | ○ | ○ | Δ |
| 35 | L11 | X11 | PET | No. 30 | ○ | Δ | Δ |
| 36 | L12 | X12 | PET | No. 30 | ○ | Δ | Δ |
| 37 | L13 | X13 | PET | No. 30 | ○ | Δ | Δ |
| 38 | L14 | X14 | PET | No. 30 | ○ | Δ | Δ |
| 39 | L15 | X15 | PET | No. 30 | ○○ | ○ | Δ |
| 40 | L16 | X16 | PET | No. 30 | ○ | Δ | Δ |
| 41 | L17 | X17 | PET | No. 30 | ○ | Δ | Δ |
| 42 | L18 | X18 | PET | No. 30 | ○ | Δ | Δ |
| 43 | L19 | X19 | PET | No. 30 | ○ | Δ | Δ |
| 44 | L20 | X1 | SiO$_2$/PET | No. 30 | ○○ | ○ | Δ |
| 45 | L21 | X20 | PET | No. 30 | ○○ | ○ | ○ |
| 46 | L22 | X20 | PET | No. 22 | ○ | ○ | ○ |
| 47 | L23 | X21 | PET | No. 22 | ○○ | ○ | ○ |
| 48 | L24 | X22 | PET | No. 22 | ○○ | ○ | ○ |
| 49 | L25 | X23 | PET | No. 22 | ○○ | ○ | ○ |
| 50 | L26 | X24 | PET | No. 22 | ○○ | ○ | ○ |
| 51 | L27 | X23 | PET | No. 10 | ○○ | ○ | ○ |

TABLE 6

| COMPARATIVE EXAMPLE | LAMINATE | COATING AGENT | SUBSTRATE | BAR COATER | STEAM BARRIER PROPERTY | COATING PROPERTY | FLEXIBILITY |
|---|---|---|---|---|---|---|---|
| 7 | M1 | Y1 | PET | No. 30 | Δ | Δ | x |
| 8 | M2 | Y2 | PET | No. 30 | Δ | Δ | x |
| 9 | M3 | Y3 | PET | No. 30 | x | x | x |
| 10 | M4 | Y4 | PET | No. 30 | x | x | x |
| 11 | M5 | Y5 | PET | No. 30 | x | x | x |
| 12 | M6 | Y6 | PET | No. 30 | x | x | x |

The present application claims priority rights of and is based on Japanese Patent Application No. 2012-009922 filed on Jan. 20, 2012 in the Japanese Patent Office, the entire contents of which are hereby incorporated by reference.

INDUSTRIAL APPLICABILITY

The steam barrier resin, the steam barrier coating agent, the steam barrier film, and the steam barrier laminate of the present invention can be preferably used for devices such as solar cells, organic electroluminescence (EL) devices and the like.

The invention claimed is:

1. A steam barrier resin comprising a copolymer mixture (C) comprising a first copolymer and a second copolymer and an organometallic complex (D), wherein the steam barrier resin includes metal bridging between the first and second copolymers and wherein:
   (i) the first copolymer consisting of an α-olefin (A1) and an unsaturated carboxylic acid and/or unsaturated dicarboxylic anhydride (B1), wherein the first copolymer comprises an average value of carbon numbers between two parts derived from the unsaturated carboxylic acid and/or the unsaturated dicarboxylic anhydride (B1) that are adjacent to each other in a range of 11 to 27, and
   (ii) the second copolymer consisting of one or more α-olefins (A2) and an unsaturated carboxylic acid and/or unsaturated dicarboxylic anhydride (B2) and comprises an average value of carbon numbers between two parts derived from the unsaturated carboxylic acid and/or the unsaturated dicarboxylic anhydride (B2) that are adjacent to each other in a range of 28 to 80, wherein the α-olefin (A1) is different from the α-olefin (A2).

2. The steam barrier resin according to claim 1, wherein the copolymer mixture (C) comprises an average value of carbon numbers between two parts derived from the unsaturated carboxylic acid and/or the unsaturated dicarboxylic anhydride that are adjacent to each other in a range of 11 to 80.

3. The steam barrier resin according to claim 1, wherein an acid value of the copolymer mixture (C) is in a range of 5 to 470 mg KOH/g.

4. A steam barrier coating agent comprising the steam barrier resin according to claim 1 and a solvent (E).

5. A steam barrier film comprising the steam barrier resin according to claim 1.

6. A steam barrier laminate comprising the steam barrier film according to claim 5, wherein the steam barrier film comprises a laminate on at least one side of a substrate film.

7. The steam barrier resin according to claim 1, wherein an acid value of the copolymer mixture (C) is in a range of 100 to 250 mg KOH/g.

8. The steam barrier resin according to claim 1, wherein an acid value of the copolymer mixture (C) is in a range of 104 to 250 mg KOH/g.

* * * * *